…

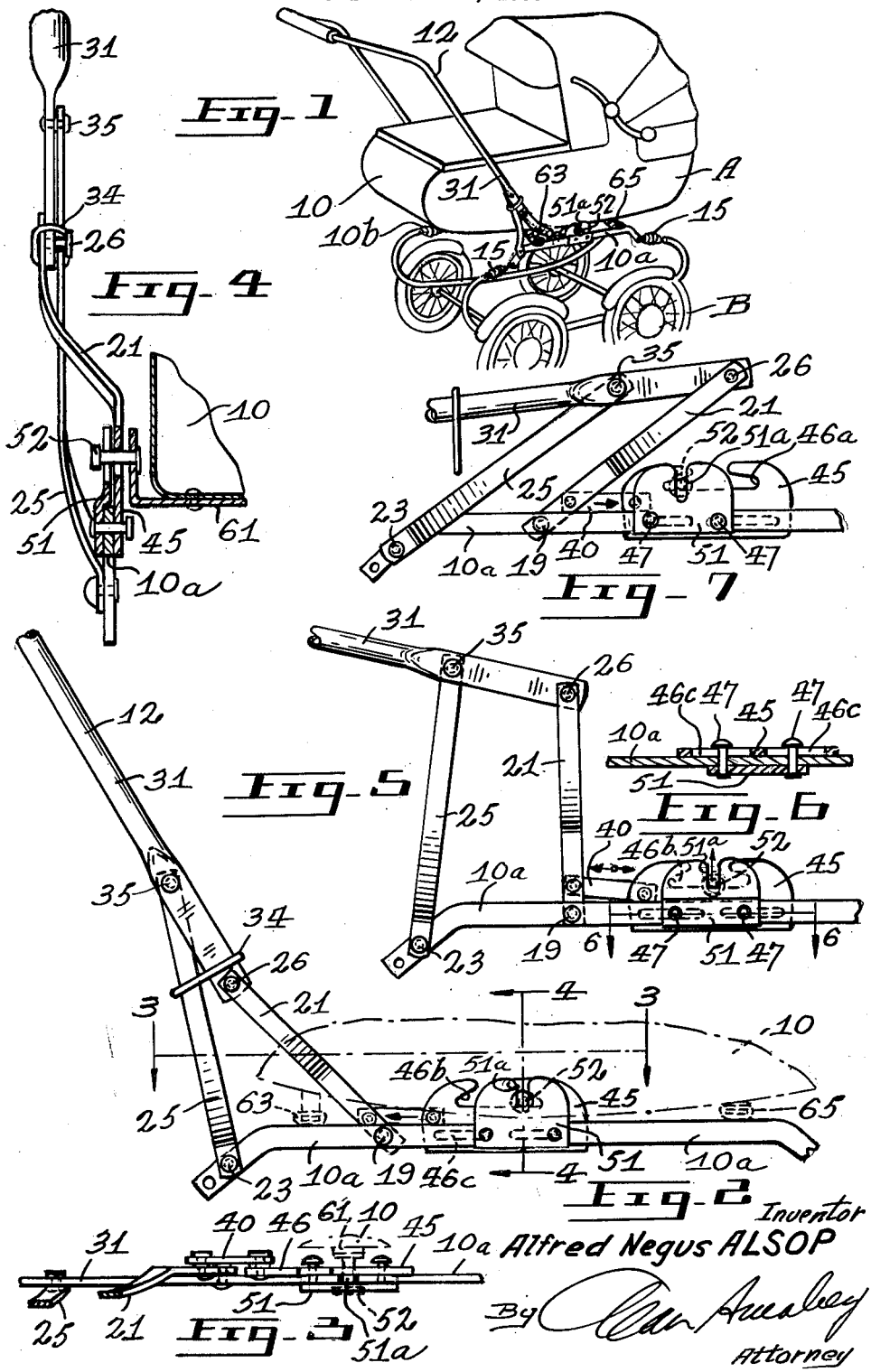

United States Patent Office 3,029,087
Patented Apr. 10, 1962

3,029,087
SLIDING CATCH LOCKING MEANS FOR BABY CARRIAGES
Alfred Negus Alsop, Verdun, Quebec, Canada, assignor to Lines Bros. (Canada) Ltd., Montreal, Quebec, Canada
Filed Dec. 21, 1960, Ser. No. 77,302
1 Claim. (Cl. 280—47.37)

This invention relates to carriages and particularly to baby carriages, children's strollers and doll carriages and strollers.

Certain types of carriages have a handle which can be folded so as to reduce the size of the carriage and which can be set up and locked for propelling and guiding the carriage. Various structures have been proposed, but these are usually complicated or suffer some other disadvantage.

For example, in one construction the carriage body is attached to the chassis with large plated knobs or luggage clips. The former has to be tightened to attach the body and loosened to release the body. The latter has to be fastened separately to each side of the carriage. This is not only a two-handed operation, but its proper performance requires strength. As these carriages are generally used by ladies, there is always the possibility of the knobs not being quite tight and consequently of the body becoming loose. The other type of fastening—the luggage type clasp—is subject to wear and thus loses efficiency with use.

The applicant's Canadian Patent 598,789 issued May 24, 1960 provided a carriage construction which overcame these difficulties and provided an ideal locking structure. Briefly, this structure included a front link and a rear link pivoted to each bed support stay of the carriage. The top of the front link is pivoted to the foot of the carriage handle. The top of the rear link, which is longer than the front link, is pivoted to the carriage handle at a point above its foot. A locking peg is provided on the bed reinforcing strip, and means including a locking catch plate actuated by the movement of the handle are provided whereby the carriage body can be easily removed or attached to the chassis without loosening or tightening knobs or bolts as is common in the prior art carriage constructions.

While this arrangement is satisfactory with respect to the described function the present invention aims to provide a further improvement in the construction and arrangement of the locking peg catch which simplifies manufacture and moreover permits a more desirable placing of the carriage handle relative to the carriage chassis affording more leverage when it is desired to tilt the carriage, for example, in passing over sidewalk curbs or other similar obstacles.

In this improved construction the carriage bed or a stay secured directly to the carriage bed is provided with outstanding locking pegs, one at each side of the carriage body and located substantially centrally of the carriage body. The bed support stays of the carriage chassis are provided with locking peg retaining plates each having a recess adapted to receive the locking peg.

The carriage handle is attached to the carriage chassis by front links and rear links pivoted to each bed support stay. The top of each front link is pivoted to the foot of the carriage handle while the other end is pivotally connected to the respective carriage stay. The top of the rear link, which is longer than the front link, is pivoted to the carriage handle at a point above its foot. A locking peg catch plate having a central recess with inwardly facing hook-shaped ends is mounted on each carriage stay for restricted sliding movement into and out of alignment with the respective peg retaining plate. A toggle link is pivotally connected at one end to the handle supporting rear link while the other end is pivotally attached to the slidable locking peg catch plate.

With this arrangement, the carriage bed is placed on the carriage support stays with the locking pegs engaged in the peg retaining plate recesses, the locking peg catch plate recess being aligned by partial folding of the handle supporting links. Pushing the handle upwardly moves the front link and, through the toggle link, slides the peg catch plate in one direction bringing one hook-shaped end of the recess over the locking peg securing it within the peg retaining plate locking the carriage bed to the bed support stays. A locking ring is provided which is dropped over the assembled links and end of the carriage handle to hold these parts in locked position.

At times it is desired to lock the carriage bed to the bed support stays when the handle is in the opposite or folded condition and with the present construction this is accomplished by merely folding the handle downwards beyond the position where the locking peg catch recess is aligned with the peg retaining plate recess so that the front link moves in the opposite direction and through the toggle link slides the other hook-shaped end of the catch plate recess over the locking peg.

This improved construction is automatic in action to the extent that as mentioned above, when the links are in the intermediate folded position, the catches are released and the carriage bed can be lifted off. When in the assembled upright position and/or fully folded position the bed or seat is securely locked in place and impossible to remove without deliberately folding the lever. The new construction is simple and thus enables extremely economical production.

Detailed Description

The invention has been generally described and it will now be referred to in more detail. In the accompanying drawings, which illustrate a preferred embodiment of the invention;

FIGURE 1 is a side elevation of a baby carriage constructed according to the invention.

FIGURE 2 is an enlarged fragmentary side elevation showing the locking arrangement as it would appear with the handle in full upright position.

FIGURE 3 is a plan view of the locking assembly of FIGURE 2 along the line 3—3.

FIGURE 4 is a view in side elevation and partially in section of the construction of FIGURE 2 along the line 4—4.

FIGURE 5 is a view corresponding to FIGURE 2 with the handle and associated linkage shown in intermediate position with carriage bed free for removal.

FIGURE 6 is a sectional view of FIGURE 5 along the line 6—6 to illustrate the construction more clearly.

FIGURE 7 is a view corresponding to FIGURE 5 with the handle and associated linkage in fully down or folded condition locking the carriage bed in position.

Referring more particularly to the drawings, the chassis of the carriage A is shown mounted on wheels B. Connected to the chassis through springs 15 are bed support stays 10a, 10b adapted to support a removable bed 10 as will be described. For convenience the structure at the side of the carriage related to the bed support stay 10a will be described, it being understood that the other side of the carriage is constructed similarly.

Pivoted to the bed support stay 10a as at 19 is a front link 21. The front link 21 is pivoted at its top end, as at 26, to the foot of one side 31 of a U-shaped handle 12. Pivoted to the bed support stay 10a as at 23 is a rear link 25. The rear link 25 is also pivoted to the handle lever 31 as at 35 at a point spaced from its foot.

The links 21 and 25 and the handle lever 12 are thus pivoted together in such a manner that they can be moved into the position shown in FIGURE 2 in which a locking ring 34 is dropped over them, as shown, to lock them in a fixed position. The locking ring may be raised to allow the links 21 and 25 and the handle 12 to be moved forward to the position shown in FIGURE 5 and further forward into a folded position as shown in FIGURE 7.

With particular reference to FIGURES 2, 5, 6 and 7 the link 21 is pivotally connected by a toggle link 40 to a locking peg catch plate 45 having a catch recess 46 having hook-shaped ends 46a, 46b. The catch plate 45 is connected to the bed support stay 10a for parallel sliding movement by studs 47 extending from the stay 10a and engaging in elongated slots 46c provided in the plate 45.

The bed support stay 10a is provided with a locking peg retaining plate 51 having a peg receiving recess 51a and which is also secured to the bed support stay 10a by the studs 47. Projecting from a bed reinforcing strip 61 of the carriage A is a locking peg 52.

When the links 21 and 25 are moved to the position shown in FIGURE 5 the catch plate recess 46 is aligned with the retaining plate recess 51a permitting entry of the locking peg 52. When the handle 12 moves up into the position shown in FIGURE 2 the catch plate 45 is moved in the direction of the handle so that the hook-shaped end 46a of the recess 46 slides over the peg 52 locking it securely within the retaining plate 51.

With reverse movement of the handle 12 as shown in FIGURE 7, namely, the fully folded position, the action is the same but in the reverse direction. The hook-shaped end 46b of the recess 46 slides over the locking peg 52 securing it within the retaining plate 51 as before.

In the construction shown, it should be mentioned that the links 21, 25 are formed so that their lower ends are offset inwardly towards their pivotal attachment with the bed support stay 10a providing maximum clearance between the body of the carriage A and the operating linkage preventing rubbing or scratching of the body in the folding operations. The peg retaining catch plate 51 is also offset inwardly, as shown in FIGURE 4, to bring it closer to the sliding catch plate 45 for the most effective bearing against and retaining of the locking peg 52. The carriage body shown has further spaced bed reinforcing strips 63 and 65 the outer ends of which bear on the bed support stay 10a for the necessary bed stability.

With this arrangement, to remove or install the removable bed 10 of the carriage on the running gear the links 21, 25 and the handle 12 are moved to the intermediate position, as shown in FIGURE 5, so that the recesses catch plate 45 and retaining plate 51 are aligned permitting insertion or removal of the peg 52.

When the links 21 and 25 are moved from the intermediate position shown in FIGURE 5 to the fully up locked position shown in FIGURE 2, the end of the locking plate 45 having the peg engaging recess 46a moves into a position where its recess 46a engages the locking peg 52.

When the links 21, 25 are moved to the other extreme or fully folded position, as shown in FIGURE 7, the substantially hook-shaped recess end 46b engages the locking peg 52 so that it is again securely locked against displacement as the carriage is handled in collapsed condition.

The members indicated in the drawing as 21, 25 being preferably made of spring steel means that when the lever handle 12 (pusher) is in the "up" position, the body or seat is not only locked firmly and securely in position, but the pressure exerted is always under tension, thus preventing any looseness developing. The same applies when the handle 12 and associated linkage are in the fully down or collapsed position since the hook-shaped ends of the catch recess 46b provides a somewhat camming action against the peg 52 urging it securely downwards into the recess 51a on the plate 51.

When used on a baby carriage the construction is equally suitable whether the removable bed is of the non-adjustable crib type, or an assembly incorporating a seat with adjustable foot rest and back rest.

This invention can be used with equal success on baby carriages, children's strollers and doll carriages and strollers. It provides:

(1) A simple and most efficient folder lever (the handle with locking ring support).

(2) The simple mechanism provides an automatic locking device to firmly secure the body to the chassis on a baby carriage and/or on a stroller, the seat to the chassis.

As will be appreciated by reference to the preceding description and accompanying drawings, in the fully up or erected position as is necessary to push the carriage the locking device is in operation retaining the body firmly on the chassis. When it is desired to remove the body, the handle and associated linkage is moved to the intermediate position freeing the locking peg. If the carriage is to be moved or stored with the body in position the movement of the handle to the fully closed or down condition again firmly locks the body to the chassis.

(3) This automatic locking device, being centrally located, enables the body or seat to be not only removed, but replaced either way, thus making the body or seat reversible.

(4) The use of the toggle link between the handle operated links and the sliding catch plate permits the location of the attachment point of the handle at one end of the bed support stay providing maximum leverage for raising or tilting the carriage wheels over obstacles when in use.

I claim:

A baby carriage construction comprising in combination, a chassis having a bed support stay, a removable bed, a front link and a longer back link pivoted in spaced apart relationship to said bed support stay, a handle having its foot pivoted to the top of said front link, an intermediate part of said handle pivoted to the top of said back link, the removable bed being provided with a locking peg, the bed support stay carrying a locking peg retaining plate having a recess adapted to receive the said locking peg, said link and handle being adapted to be moved from a first unfolded locked position in which the tops of the links are adjacent one another, to a second unlocked and partially folded condition in which the ends of the links are removed from one another, and to a third locked and fully folded condition in which the tops of the links are returned to adjacent one another, the said front link being connected by a toggle link to a locking peg catch plate mounted for sliding movement on said bed support stay in juxtaposed relationship with said peg retaining plate, said locking peg catch plate having a pair of spaced apart recesses, one of said recesses being adapted to engage the said locking peg when said linkage is in said first locking position and the other adapted to engage said locking peg when said linkage is moved to said third locking position.

References Cited in the file of this patent

FOREIGN PATENTS

| | | |
|---|---|---|
| 578,849 | Canada | June 30, 1959 |
| 753,337 | Great Britain | July 25, 1956 |